(12) United States Patent
Saad et al.

(10) Patent No.: US 7,794,088 B1
(45) Date of Patent: Sep. 14, 2010

(54) CAMERA SUPPORT FOR CINEMATOGRAPHY EQUIPMENT

(76) Inventors: Philip Saad, 60 Butternut La., Stratford, CT (US) 06614; Jeremiah Dalton, 120 Marion Ave., Staten Island, NY (US) 10304

( * ) Notice: Subject to any disclaimer, the term of this patent is extended or adjusted under 35 U.S.C. 154(b) by 501 days.

(21) Appl. No.: 11/973,938

(22) Filed: Oct. 10, 2007

Related U.S. Application Data

(60) Provisional application No. 60/850,592, filed on Oct. 10, 2006.

(51) Int. Cl.
*G03B 17/00* (2006.01)
(52) U.S. Cl. ............... 352/243; 348/373; 248/298.1; 248/346.06
(58) Field of Classification Search .............. 352/242; 248/298.1, 346.03, 346.06; 348/373; 396/419, 396/428
See application file for complete search history.

(56) References Cited

U.S. PATENT DOCUMENTS

| | | | |
|---|---|---|---|
| 2,842,026 A | 7/1958 | Reese et al. | |
| 4,409,860 A * | 10/1983 | Moriyama et al. | 74/490.09 |
| 4,498,744 A | 2/1985 | Ealovega et al. | |
| 4,685,649 A | 8/1987 | McKay | |
| 4,699,484 A * | 10/1987 | Howell et al. | 352/243 |
| 4,729,536 A * | 3/1988 | Scala | 248/429 |
| 5,265,491 A * | 11/1993 | Nishiumi | 74/490.09 |
| 5,549,014 A * | 8/1996 | Cuneo et al. | 74/89.33 |
| 5,698,959 A * | 12/1997 | Yanagisawa | 318/568.11 |
| 5,908,181 A | 6/1999 | Valles-Navarro | |
| 5,974,978 A | 11/1999 | Brown et al. | |
| 6,217,236 B1 | 4/2001 | Chapman | |
| 6,260,971 B1 | 7/2001 | Cardellini | |
| 6,775,475 B1 * | 8/2004 | Traver | 396/1 |
| 7,637,215 B2 * | 12/2009 | Fisher | 105/159 |

* cited by examiner

*Primary Examiner*—William C Dowling
(74) *Attorney, Agent, or Firm*—Ware, Fressola Van Der Sluys & Adolphson, LLP

(57) ABSTRACT

The camera support for cinematography equipment has end blocks and side beams forming a perimeter frame with an open central area. The perimeter frame is adapted to mount to a secondary support. Track rails extending along the side beams slidingly mount a trolley plate on rollers received in track slots and a camera is mounted to the trolley plate for sliding movement along the perimeter frame. The camera may be mounted above the trolley plate or below the trolley plate where it is accommodated by the open central area. The trolley plate is mounted on rollers received in slots designed by the track rails, and a magnetic friction device provides controlled resistance to translation.

22 Claims, 8 Drawing Sheets

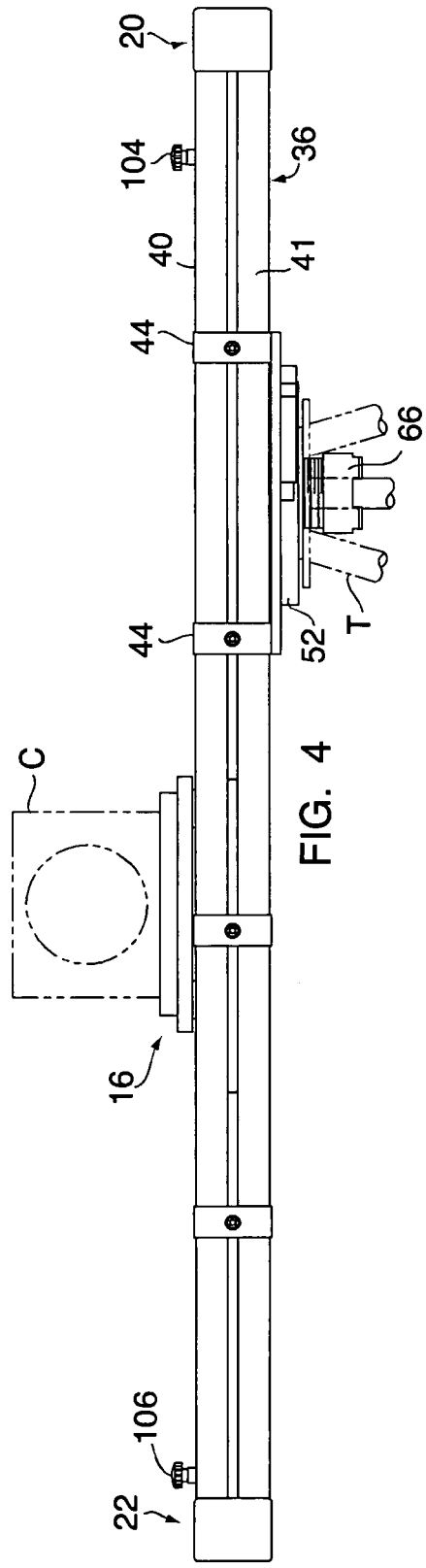
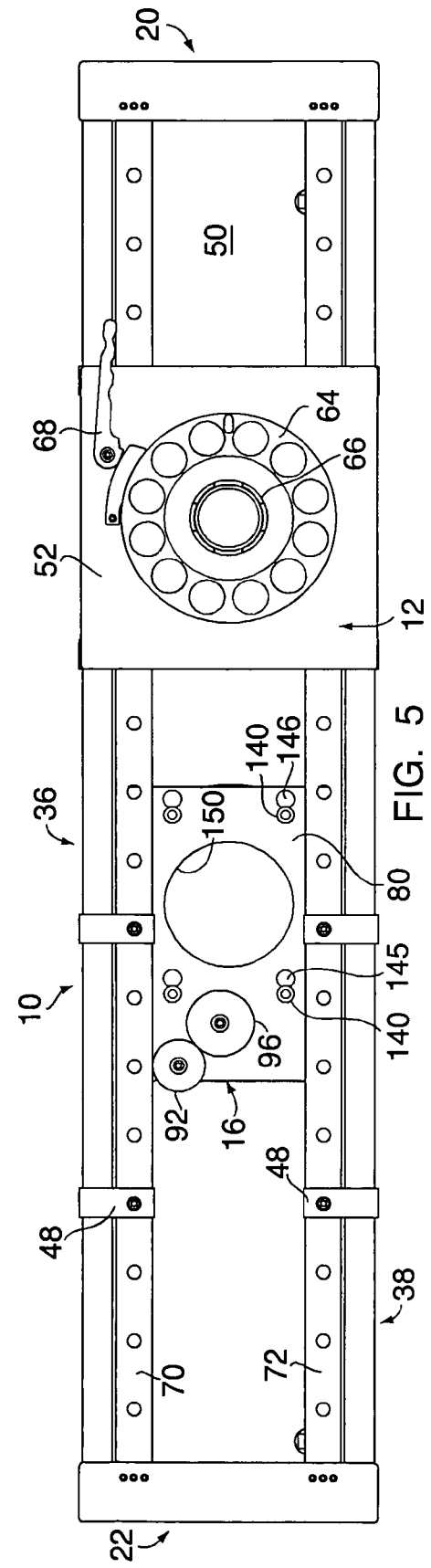

CAMERA SUPPORT FOR CINEMATOGRAPHY EQUIPMENT

RELATED APPLICATION

This application claims priority to our U.S. Provisional Application Ser. No. 60/850,592 filed Oct. 10, 2006.

FIELD OF INVENTION

The invention herein relates to a camera support adapted for mounting to a secondary support such as a camera dolly, boom or tripod, wherein the camera support mounts and permits movement of cinematography equipment, and particularly cameras.

BACKGROUND OF INVENTION

The creative aspects of cinematography require that cameras, or other such cinematography equipment including film cameras, video cameras, digital cameras as well as potentially other equipment, be moveable to achieve a desired image or effect. As used herein, the term "camera" will be used to refer to all such cinematography equipment, both existing and yet to be developed or used in the same or similar manner as existing equipment. The images or effects that may be desired may be achieved by changing the angle or distance at which relatively stationary subjects are viewed, movement to follow a moving subject, as well as all kinds of other considerations that require movement of the camera.

This can be accomplished by mounting the camera to a camera support that is in turn mounted to a secondary support, such as a camera dolly, camera boom or a fixed secondary support. The camera support provides for movement of the camera with respect to the secondary support, which may be at a fixed location during the times of camera operation or may also be moved during times of camera operation, e.g. a dolly may be moved to follow action or to reposition a camera support and camera with respect to a set.

The camera supports available in the art all demonstrate certain drawbacks. Such drawbacks include unsteady support of the camera, lack of smooth movement of the camera, and noise generated by the movement. In particular, it is difficult for a camera operator to achieve smooth and steady movement of the camera on the camera support while filming. Also, limitations exist in positioning the camera, i.e. either the amount of movement is limited and the option of top-mounting or under-mounting the camera on a camera support has not existed. The existing camera supports are also noisy, to the point that they create an unwanted intrusion into simultaneous sound recordings.

Therefore, an improved mount for cinematography equipment would be a welcome advance in the art.

SUMMARY OF THE INVENTION

It is a principal object of the invention herein to provide an improved camera support for cinematography equipment.

It is an additional object of the invention herein to provide a camera support that is steady, smooth and quiet in its operation.

It is a further object of the invention herein to provide a camera support that is adaptive to different mounted positions on a secondary support and to different positions of cameras on the camera support.

In carrying out the foregoing and other objects of the inventions, there is provided a camera support having first and second end blocks and first and second side beams secured to the first and second end blocks to form a perimeter frame with an open central area. First and second track rails are respectively mounted to the end blocks and a respective one of the side beams adjacent thereto, the track rails each defining a track slot. A mounting assembly for the camera support includes a top mounting plate secured to and extending between the side beams at a selected location thereon, the mounting assembly being configured for mounting to a secondary camera support. A trolley assembly including a trolley plate is slidingly mounted on the track rails for sliding movement toward and away from the end blocks, by rollers mounted to the trolley plate and received in the track slots. A Mitchell plate is attached to the trolley plate for receiving and mounting cinematography equipment, whereby the equipment may be slidingly translated and positioned along the track rails.

According to additional aspects, the side beams are tubes, and may be two tubes on each side of the perimeter of the frame. The tubes and the track rails are secured together by intermediate blocks, and the top mounting plate of the mounting assembly is selectively secured to intermediate blocks or to a combination of an end block and intermediate blocks. The end blocks and intermediate blocks are equally spaced apart, so that the top mounting plate and associated mounting assembly can be accommodated at a plurality of mounting positions along the perimeter frame.

In further aspects, the mounting assembly is a pan mechanism, including a standard adapter pivotally mounted to the top plate. A standard adapter is preferably a Mitchell plate. A shank and castle nut are provided for securing the Mitchell plate to a mating Mitchell plate associated with the secondary support. The pan mechanism has a rotation lock.

Also according to desired aspects, the trolley assembly includes a generally rectangular trolley plate mounted on multiple nylon rollers respectively positioned at the corners thereof. Three rollers may be used at each corner. The trolley assembly is also provided with adjustable frictional engagement with one of the track rails, and the adjustable friction may be provided by magnetic force to avoid sticktion in stopping and starting the camera motion. The trolley assembly is further provided with shock absorbers, which may act on the end blocks or on adjustable stops positioned along the side beams of the perimeter frame. A lock is provided to secure the trolley assembly in a desired position.

The trolley plate supports a Mitchell plate on spacer legs, the Mitchell plate accepting and mounting the camera or other cinematography device. The spacer legs are received in keyways formed in the trolley plate, such that the Mitchell plate may be mounted upwardly from the trolley plate opposite the mounting assembly, or may be mounted downwardly from the trolley plate adjacent the mounting assembly for undermounting the camera. This is permitted by the open central area of the perimeter frame, and the amount of travel of the trolley plate is in part determined by the selected position of the mounting assembly on the perimeter frame.

Other and more specific objects and features of the invention herein will in part appear to those skilled in the art and will also appear in the following description of preferred embodiments and the claims, taken together with the drawings.

BRIEF DESCRIPTION OF DRAWINGS

FIG. 4 is a side elevation view of the camera support of FIG. 1;

FIG. 5 is a bottom view of the camera support of FIG. 1;

The same reference numerals refer to the same elements throughout the various Figures.

DETAILED DESCRIPTION

A camera support 10 is shown in the various figures and generally comprises a perimeter frame 12, a mounting assembly 14 for mounting the camera support on a secondary support, such as a camera dolly, boom or tripod T, and a trolley assembly 16 for mounting a camera C or other piece of cinematography equipment to the camera support 10. The mounting assembly 14 provides for panning by rotating the camera support on the secondary support, and the trolley assembly 16 provides for translating the camera C along the length of the perimeter frame 12.

Figure 1:
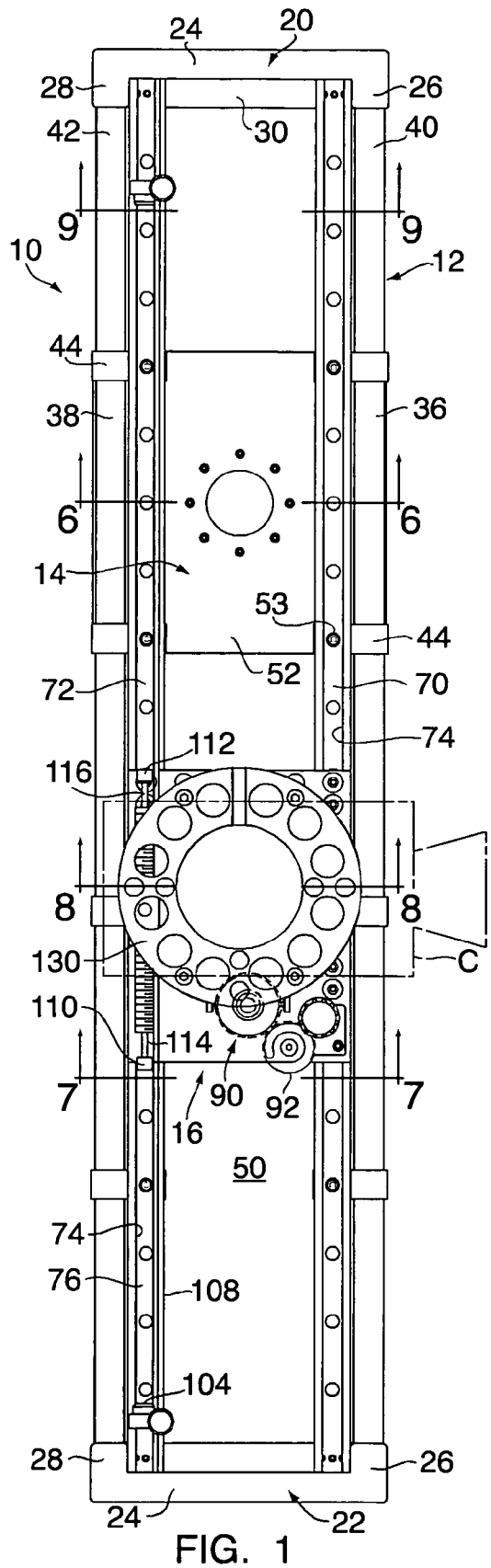
FIG. 1 is a top plan view of a camera support according to the invention herein.
Figure 2:
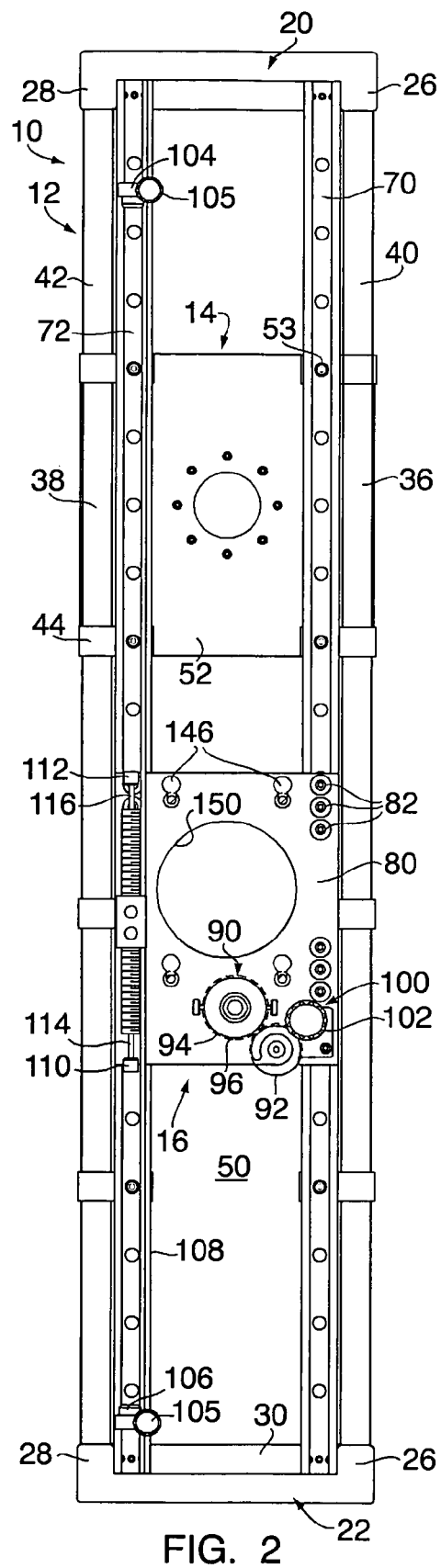
FIG. 2 is a top plan view of the camera support of FIG. 1, partially disassembled.
Figure 3:
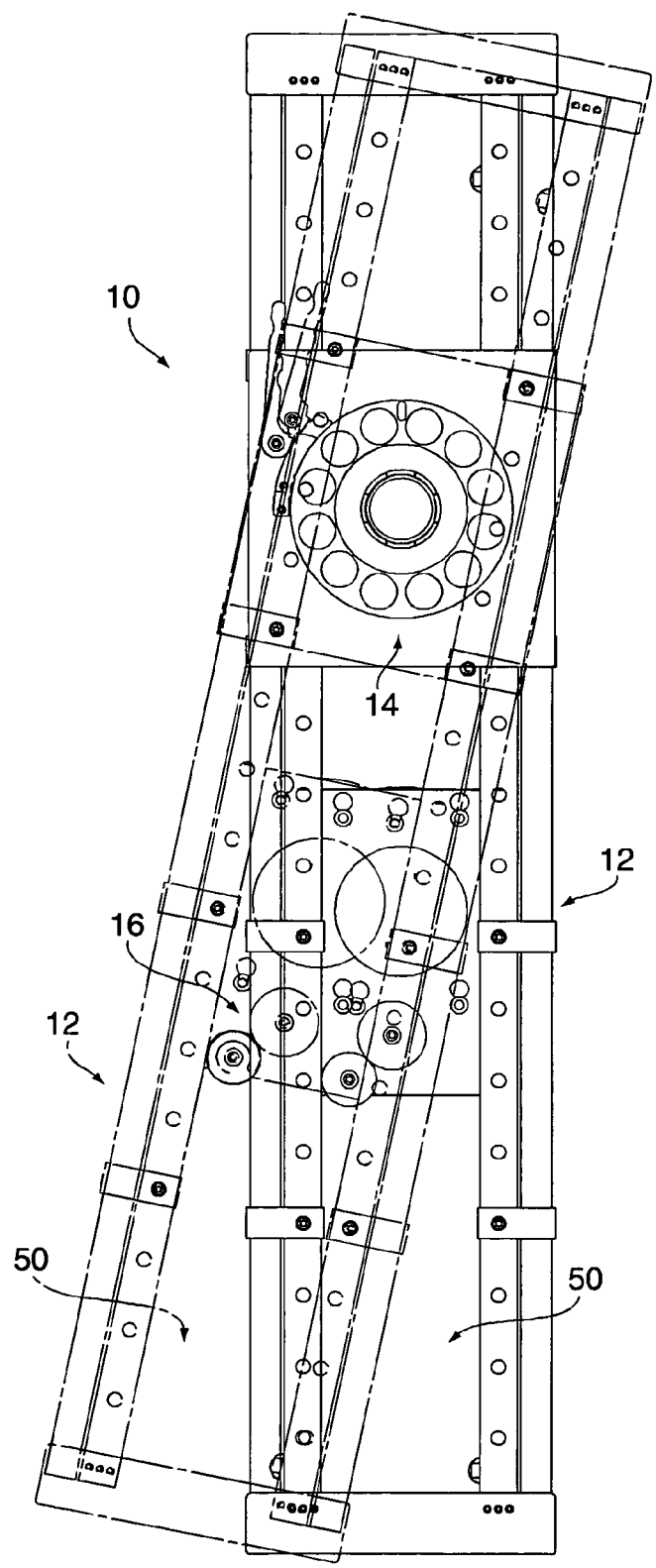
FIG. 3 is a bottom plan view of the camera support of FIG. 1, showing pan capability.
Figure 6:
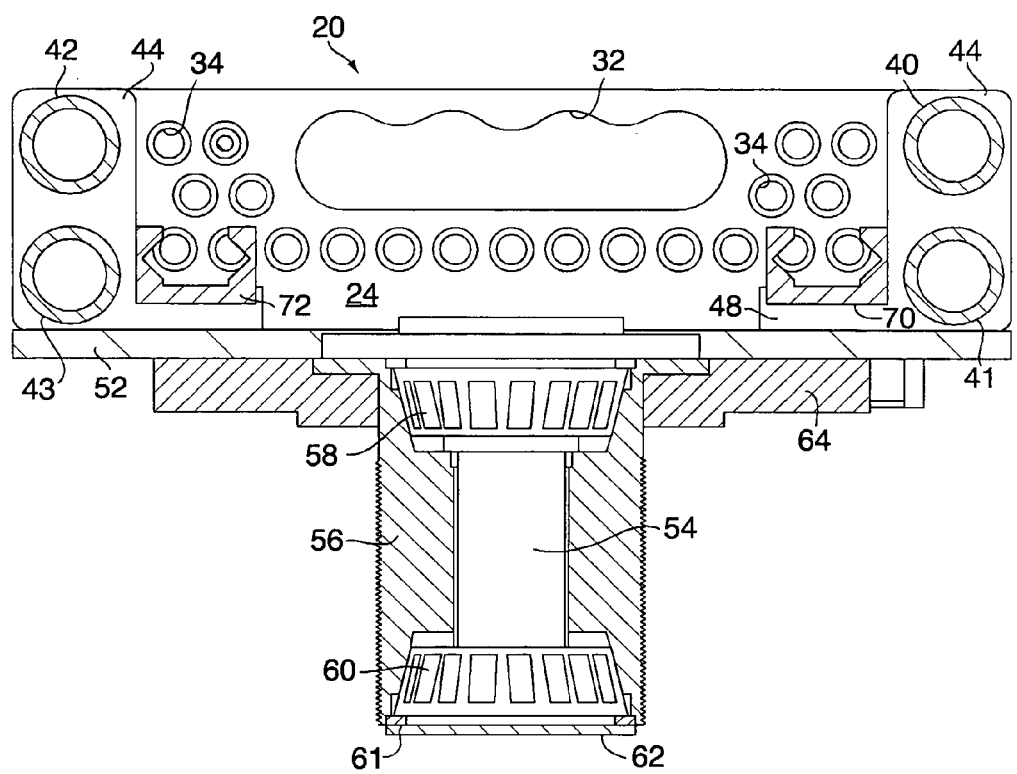
FIG. 6 is a sectional view of the camera support of FIG. 1, taken along the lines 6-6 of FIG. 1.
Figure 9:
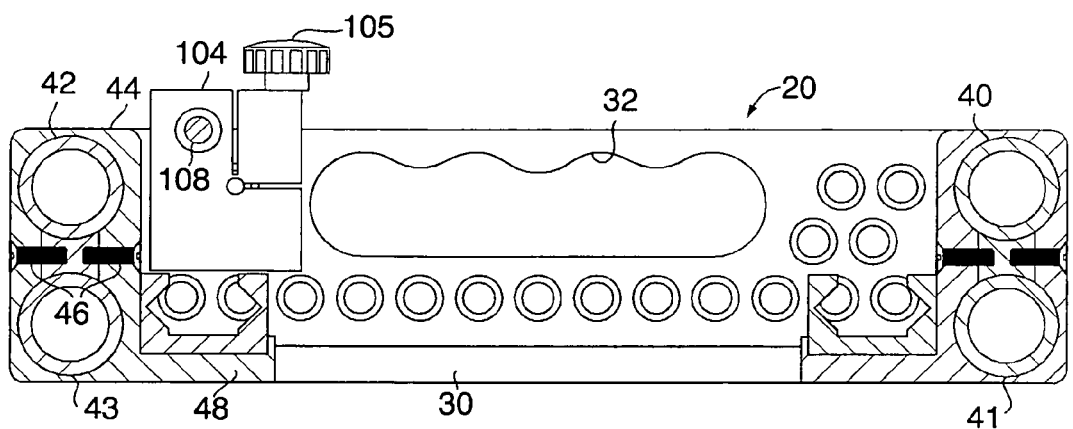
FIG. 9 is a sectional view of the camera support of FIG. 1, taken along the lines 9-9 of FIG. 1.

As seen in FIGS. 1 and 2, the perimeter frame 12 has two end blocks 20 and 22. Both end blocks 20 and 22 are generally U-shaped with the base 24 of the U providing the ends of the perimeter frame 12 and the legs 26, 28 of the U extending from the base 24. Additionally, a cross flange 30 extends between the legs 26 and 28. The end blocks 22, 24 may be provided with handle holes 32 seen on FIGS. 6 and 9 for lifting the camera support 10. The end blocks 20, 22 may have a plurality of holes 34, some of which may be threaded, for mounting other accessories and the like, not shown, or for end mounting the camera support 10 on a secondary support.

The perimeter frame 12 also has side beams 36 and 38, which are provided in the embodiment shown by tubes 40, 41 for side beam 36 and tubes 42, 43 for side beam 38. The tubes are respectively received in openings in the legs 26, 28 of the end blocks 20, 22 and are secured therein. The tubes are preferably cylindrical, but may have other shapes.

The perimeter frame 12 further has a plurality of intermediate blocks 44, which are spaced at regular intervals along the tubes 40-43 forming the side beams 36 and 38. The intermediate blocks 44 are secured to the tubes 41-43 by gibs 46, seen in FIG. 9. The intermediate blocks 44 are L-shaped, having a bottom leg 48 that extends inwardly from the side beams 36 and 38.

The perimeter frame 12 defines a substantially open central area 50 between the end blocks 20-22 and the side beams 36-38. This central area 50 provides great flexibility in configuring and using the camera support 10, as more fully discussed below.

Figure 7:
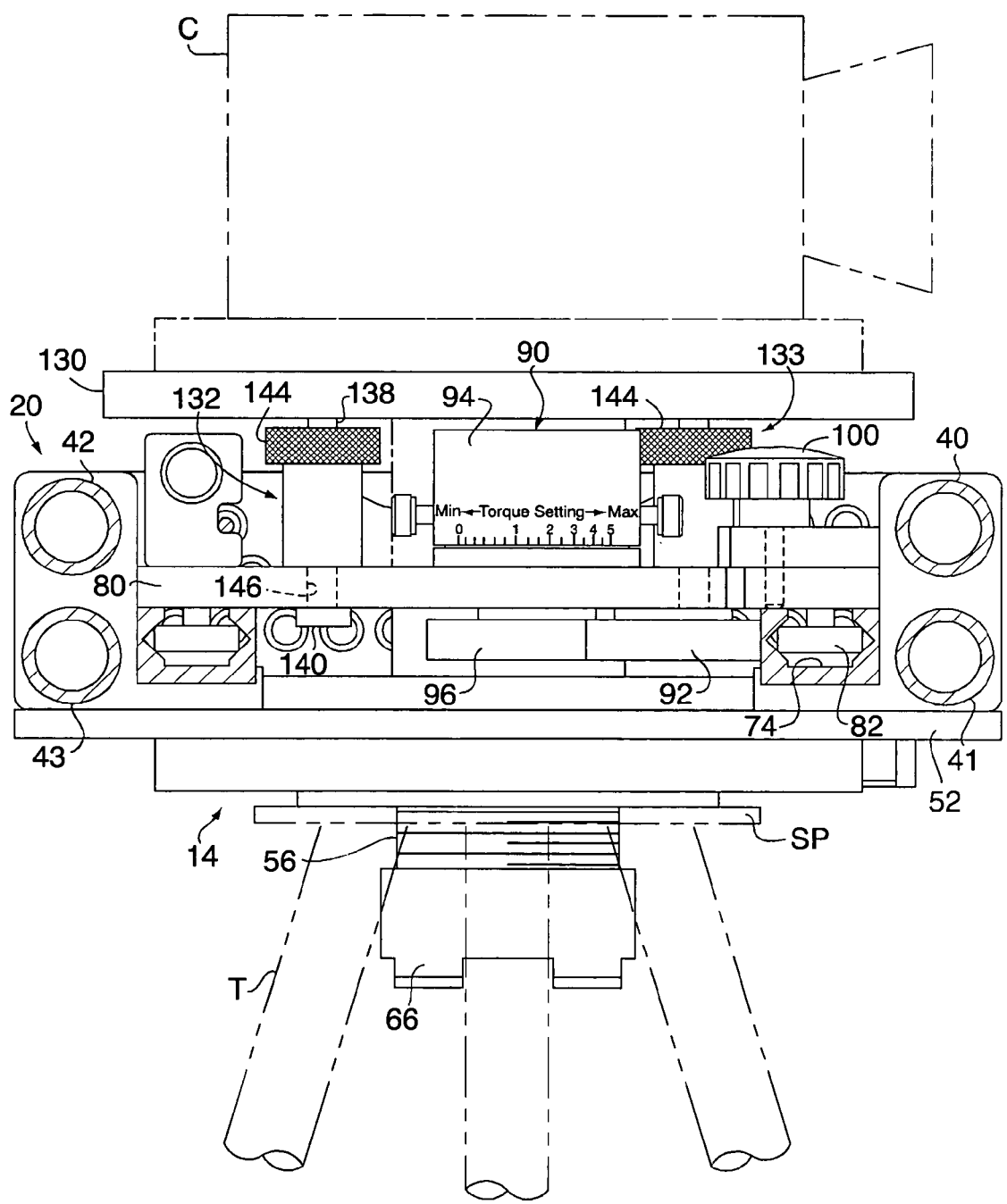
FIG. 7 is a sectional view of the camera support of FIG. 1, taken along the lines 7-7 of FIG. 1.

The perimeter frame 12 is mounted to a secondary support by the mounting assembly 14. A tripod T is shown in FIG. 7 as the secondary support for simplicity, and it will be understood that the secondary support may be a camera dolly, a boom, or any other support used in cinematography. In the camera support 10, the mounting assembly 14 includes a pan capability. The mounting assembly 14 has a top mounting plate 52, which is generally rectangular and which is sized to coordinate with the regular spacing between the intermediate blocks 44 and end blocks 20, 22 such that the top mounting plate may have its corners secured to adjacent pairs of intermediate blocks 44 or to one of end blocks 20, 22 and an adjacent intermediate block 44. Fasteners 53 can be seen in FIGS. 1 and 2. A spindle hub 54 is secured to and extends downwardly from the top mounting plate 52, and an outer casing 56 is supported on the spindle hub by upper and lower tapered roller bearings 58 and 60. A disk 61 secures the bearings and the outer casing on the spindle hub 54, and a cover 62 seals bearing space with reference to FIGS. 6 and 7, a pan scrub pad which is one plate 64 of a Mitchell mount, is supported on the outer casing 56. The exterior outer casing 56 is threaded to form a mounting shank and receives a castle nut 66.

The mounting assembly 14 is used to mount the camera support 10 by inserting the threaded outer casing 56 through the central opening in a support plate SP of tripod T. The support plate SP may be a second Mitchell plate provided on a secondary camera support, which may be a camera dolly, a boom or a tripod, with a tripod being shown for simplicity's sake. The castle nut is used to secure the Mitchell plates 64 thereon. The top mounting plate 14 of camera support 10 is thereby free to rotate on the bearings 58 and 60 relative to the Mitchell mount on the tripod T or other secondary camera support. A cam lock 68 is engageable to secure the pan at a desired location.

The Mitchell mount is a well-known industry standard structure for mounting all types of cameras and other equipment. A Mitchell mount consists of two mating Mitchell plates, one of which has a slot and the other of which has a key, so that when the plates are placed in facing relationship, the key is received in the slot to prevent relative rotation. A large threaded stud is generally provided on the equipment and extends through the facing Mitchell plates, where it is secured by a castle nut. The outer casing 56 of the mounting assembly 14 is the standard size of the usual mounting shank. It will be appreciated that the mounting assembly 14 may use any configuration adapted for securing the camera support to a secondary support, e.g. if the industry standard were to change from the Mitchell mount shown or if modifications were made to the Mitchell mount system.

Figure 10:
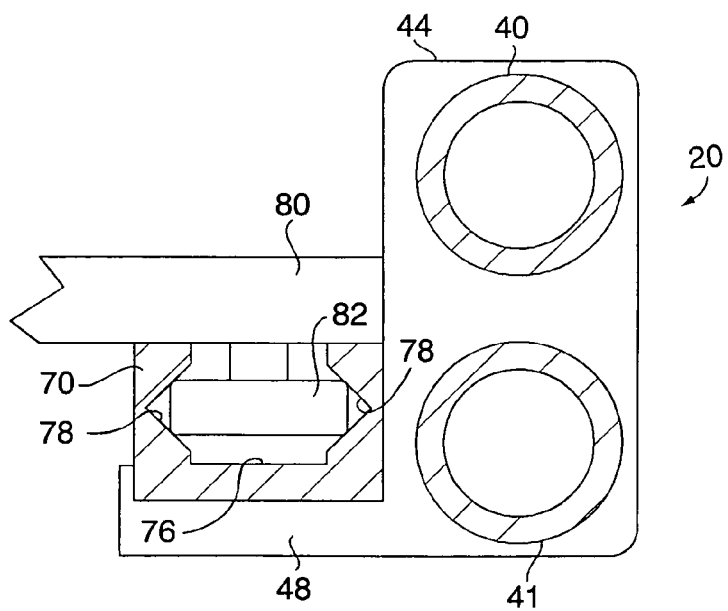
FIG. 10 is an enlarged fragmentary view of the camera support of FIG. 1.
Figure 11:
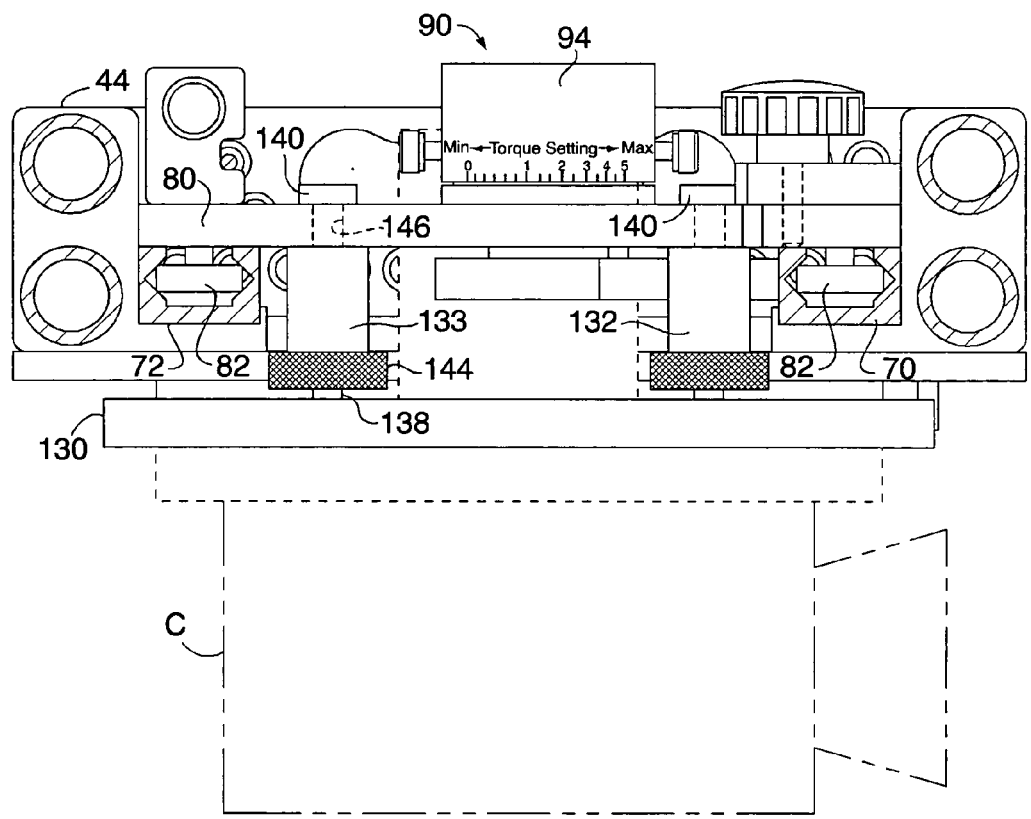
FIG. 11 is a sectional view of the camera support of FIG. 1, with the camera support providing an underslung mounting.

The perimeter frame 12 includes two track rails 70 and 72 which are respectively secured between the end blocks 20, 22 adjacent the side beams 36 and 38. More particularly, the track rails are secured to and supported by the cross flanges 30 of the end blocks 20, 22 at their ends, and are supported by the L-shaped legs 48 of the intermediate blocks 44. As best seen in FIG. 10, each track rail 70, 72 defines a track slot 74 which has a flat bottom 76 and opposed V-shaped side walls 78. Although it is expedient to provide the track rails independently of the side beams 36, 38, it will be appreciated that the track rails and side beams may be unitary, and that intermediate blocks would then not be required to support independent track rails.

The trolley assembly 16 has a trolley plate 80, which is generally rectangular and is received between the side beams 36, 38. The trolley plate 80 is mounted for sliding translation on the track rails 70, 72 by rollers 82 mounted to the trolley plate at the corners thereof, with the rollers 82 being received in the track slots 74. In the camera support 10, three rollers 82 are positioned at each corner of the trolley plate 80. The rollers are nylon rollers mounted by bearing roller shafts secured to the trolley plate 80, and the nylon rollers engage the V-shaped side walls of the track slot 74.

The trolley assembly 16 has a controlled friction brake 90, which operates to adjustably retard the translating or sliding motion of the trolley plate 80 along the track rails 70, 72. This is achieved by a first idler roller 92 mounted to the trolley plate 80 and engaging the track rail 70. The idler roller 92 preferably has a high friction rubber surface, so that the idler roller 92 rotates as the trolley plate 80 moves along the track rail 70. The friction force is provided by an adjustable magnetic torque unit 94 that has a roller 96 mounted on its output shaft, the roller 96 engaging the idler roller 92 to couple the torque unit 94 with the track rail 70. The torque unit 94 utilizes magnetic force to resist rotation of its output shaft, and that resistance is coupled with the track rail 70 through the rollers 92, 96 to provide a friction brake resisting movement of the trolley plate 80. The amount of resistance can be adjusted, and a range of from about zero to 20-ounce/inches of torque is suitable. Other torque ranges may be suitable in part depending on the weight of the camera C or other equipment mounted on the trolley assembly 14. The torque unit 94 may be model MC2 sold by Warner Electric. Magnetic force is preferable for the friction brake, as it avoids any sticktion effect on initial movement. The use of the friction brake 90 is desirable as it assists the operator in imparting smooth motion to a camera C mounted on the trolley assembly 16.

The camera support 10 provides further control of the sliding motion of trolley plate 80. A stop lock 100 is mounted to the trolley plate 80 juxtaposed the track rail 70. The stop lock 100 is a set screw having a manual knob 102 that can be turned against the track rail to lock the trolley plate 80 in a desired position. The travel of the trolley plate 80 may also be limited by adjustable stops 104 and 106 mounted on a rod 108 extending between the end blocks 20 and 22. The adjustable stops 104 and 106 are secured by set screws and knobs 105 and 107 to lock the adjustable stops at a desired position along the rod 108. Of course, the adjustable stops 104, 106 can be moved to the ends of the rod 108 adjacent the end blocks 20, 22, to permit full range of travel. The trolley plate 80 mounts cooperating stops 110 and 112 positioned to engage the adjustable stops 104 and 106, respectively. The stops 110 and 112 are mounted as the effectuator ends of shock absorbers 114 and 116, which are mounted on the trolley plate by a mounting block 118. The shock absorbers 114, 116 operate to bring a trolley plate to a stop by controlled deceleration, with no or minimal jarring. Fluid/air shock absorber units may be used for this purpose, as may other shock absorbers.

The trolley plate 80 mounts a camera C, or such other piece of cinematography equipment as may be desired. As also noted above, the motion picture industry has adopted the Mitchell plate system as a standard mount for cameras and the like, although it is possible that other standard or custom mounts may be utilized in the industry and in connection with the camera support 10. The cinematography equipment often has one Mitchell plate and a threaded mounting leg may be inserted and secured with a castle nut to a Mitchell plate of a support, which both secures the two plates together to mount the cinematography equipment.

Figure 8:
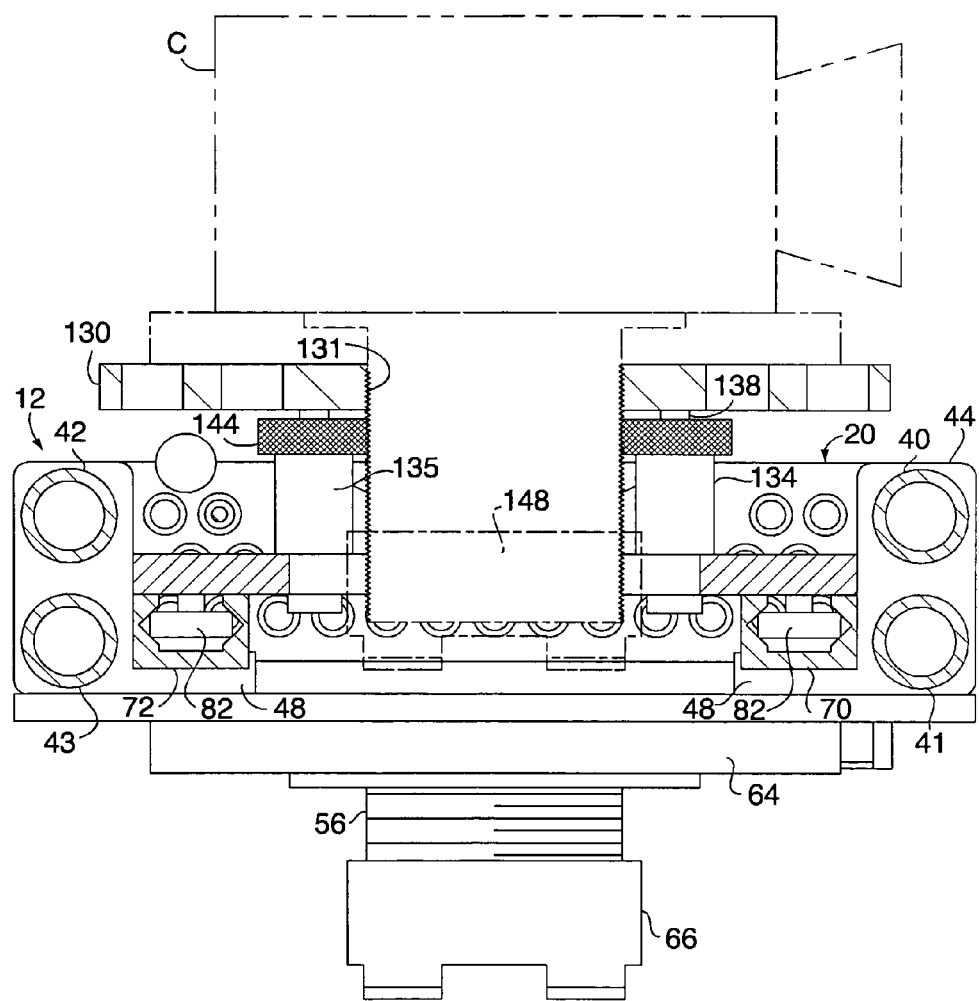
FIG. 8 is a sectional view of the camera support of FIG. 1, taken along the lines 8-8 of FIG. 1.

To facilitate the foregoing mounting arrangement and with particular reference to FIGS. 7 and 8, a first Mitchell plate 130 is supported on the trolley plate 80 by spacer legs 132-135. The spacer leg 132 has a threaded shank 138 extending downwardly from the under side of the Mitchell plate and head 140 is provided at the distal end thereof. The threaded shank 138 receives an elongated knurled nut 144 that may be rotated to establish a clearance for the head 140. Each of the spacer legs 132-135 is similarly constructed.

The trolley plate defines four keyways 146 for receiving the heads 140 of the spacer legs 132-135, and the elongated nuts 144 are first turned to establish clearance for inserting the heads 140 in keyways 146, and are then turned to clamp the spacer legs to the trolley plate 80. This mounts the Mitchell plate 130 to the trolley plate 80, spaced apart therefrom. A camera C or other piece of cinematography equipment may then be mounted to the Mitchell plate 130 by inserting its threaded mounting shank through the central opening 131 in the Mitchell plate 130, and securing the assembly by castle nut 148. The trolley plate 80 defines a large central opening 150 which facilitates access to the castle nut 148, for removing and installing Camera C or equipment.

The Mitchell plate 130 and the camera C are often top mounted on the camera support 10, i.e. they are mounted opposite the mounting assembly 14. However, because of the open architecture of the perimeter frame 12 and its open central area 50, the camera may also be under-mounted on the camera support 10. This is accomplished by removing the Mitchell plate 130 and the spacer legs 132-135, and inserting the heads 140 of spacer legs 132-135 through the keyways 146 from the under side the trolley plate 80. It will be noted that for undermounted camera mounts, it is generally desirable to position the mounting assembly 14 at one of the ends of the camera support 10, wherein the remainder of the central area 50 of perimeter frame 12 is available for sliding movement of the trolley assembly 16 without interference of the camera C with the mounting assembly.

It will also be appreciated that the camera support 10 can be made in various lengths, preferably in increments of the distance between the end blocks and intermediate blocks. Thus, the camera support 10 shown in the drawings is a four-foot unit, and units of three feet, five feet and six feet, as well as other lengths, may be provided.

The camera support 10 is characterized by very smooth and quiet operations, and provides a cameraman with many options of use, including top mount and undermounting of a camera, adjustable panning, selecting a range of translation, applying adjustable sticktionless resistance to translation, and locking at selected locations.

Accordingly, a camera support has been provided that admirably achieves the objects of the invention herein. It will be appreciated that the camera support described is a preferred embodiment of the invention, and that various changes may be made without departing from the spirit and scope of the invention, which is limited only by the following claims.

We claim:

1. A camera support for a camera or other cinematography equipment comprising:
  A) first and second end blocks and first and second side beams respectively secured to the first and second end blocks to form a perimeter frame with an open central area;
  B) the perimeter frame including first and second track rails respectively extending along the first and second side beams;
  C) a mounting assembly having a top mounting plate secured to and extending between the first and second side beams, the top mounting plate being mountable at selected locations thereon, the top mounting assembly adapted to releasably mount the camera support to a secondary support;
  D) a trolley plate slidingly mounted on the first and second track rails by rollers mounted to the trolley plate and received in track slots defined by the first and second track rails; and E) a camera mounting plate mounted to the trolley plate, the camera mounting plate adapted to releasably mount a camera or other cinematography equipment to the trolley;

whereby the camera or other cinematography equipment may be slidingly translated and positioned along the perimeter frame.

2. A camera support as defined in claim 1, wherein the side beams are tubes secured between the first and second end blocks.

3. A camera support as defined in claim 2, wherein each side beam comprises two tubes.

4. A camera support as defined in claim 3 and further comprising intermediate blocks secured at spaced apart intervals along the two side tubes of each side beam.

5. A camera support as defined claim 4 wherein the top mounting plate is secured to at least one intermediate block on each side beam.

6. A camera support as defined in claim 5 wherein the intermediate blocks are evenly spaced along the side beams, whereby the top mounting plate may be secured at selected incremental positions along the perimeter frame.

7. A camera support as defined in claim 1 wherein the mounting assembly further comprises a pan scrub pad rotatably mounted to the top mounting plate and providing pan capability of the perimeter frame with respect to a secondary support.

8. A camera support as defined in claim 7 wherein the mounting assembly further comprises a releasably lock for securing the top mounting plate and pan scrub plate in adjusted pan position.

9. A camera support as defined in claim 1 wherein the trolley plate is generally rectangular and the rollers mounted to the trolley plate and received in the track slots comprise a respective plurality of rollers mounted to the track plate adjacent each corner thereof.

10. A camera support as defined in claim 9 wherein there are three rollers mounted adjacent each corner of the trolley plate.

11. A camera support as defined in claim 10 wherein the track slots include facing V-shaped side walls engaged by the rollers.

12. A camera support as defined in claim 1 and further comprising a controlled friction brake assembly mounted to the trolley plate and engaging one of the first and second track rails, the controlled friction plate providing adjustable resistance to sliding motion of the trolley plate along the first and second track rails.

13. A camera support as defined in claim 12 wherein the controlled friction brake assembly includes an adjustable magnetic torque unit.

14. A camera support as defined in claim 1 and further comprising first and second shock absorbers mounted on the trolley plate for respectively engaging the first and second end plates to provide controlled deceleration of the trolley plate as it is slidingly translated against an end block.

15. A camera support as defined in claim 1 and further comprising at least one stop adjustably positioned along one of the first and side beams for engaging the trolley plate at a selected stop position.

16. A camera support as defined in claim 1 wherein the trolley plate further comprises a stop lock for locking the trolley plate in the selected position along the perimeter frame.

17. A camera support as defined in claim 1 wherein the trolley plate supports a camera mounting plate on spacers, the spacers being releasably secured to the trolley plate.

18. A camera support as defined in claim 17 wherein the spacers support the camera mounting plate above the trolley plate and perimeter frame.

19. A camera support as defined in claim 17 wherein the spacers support the camera mounting plate below the trolley plate.

20. A camera support as defined in claim 17 wherein the spacers are releasably keyed to the trolley plate and are selectably secured to the trolley plate to mount the camera mounting plate selectively above or below the trolley plate.

21. A camera support as defined in claim 17 wherein the camera mounting plate is a Mitchell plate.

22. A camera support as defined in claim 21 wherein the trolley plate defines a central opening accommodating and providing access to a castle nut securing a camera to the Mitchell plate.

* * * * *